(12) United States Patent
Panotopoulos et al.

(10) Patent No.: US 7,382,357 B2
(45) Date of Patent: Jun. 3, 2008

(54) USER INTERFACE INCORPORATING EMULATED HARD KEYS

(75) Inventors: Georgios Panotopoulos, Palo Alto, CA (US); Dale W. Schroeder, Scotts Valley, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 480 days.

(21) Appl. No.: 11/113,930

(22) Filed: Apr. 25, 2005

(65) Prior Publication Data
US 2006/0238510 A1    Oct. 26, 2006

(51) Int. Cl.
G06G 5/00    (2006.01)
G06F 3/02    (2006.01)

(52) U.S. Cl. .............. 345/168; 345/169; 345/173; 345/174

(58) Field of Classification Search ........ 345/168–169, 345/173–176; 434/112–114; 400/109, 109.1, 400/483; 341/22–26; 340/825.19
See application file for complete search history.

(56) References Cited

U.S. PATENT DOCUMENTS

| | | | |
|---|---|---|---|
| 5,579,002 A * | 11/1996 | Iggulden et al. ............. 341/23 |
| 5,717,423 A | 2/1998 | Parker | |
| 6,509,892 B1 | 1/2003 | Cooper et al. | |
| 6,877,986 B2 * | 4/2005 | Fournier et al. ............ 434/112 |
| 7,138,985 B2 * | 11/2006 | Nakajima ................... 345/173 |
| 7,253,807 B2 * | 8/2007 | Nakajima ................... 345/173 |
| 2003/0206153 A1 * | 11/2003 | Murphy ..................... 345/168 |
| 2004/0056876 A1 * | 3/2004 | Nakajima ................... 345/702 |
| 2004/0056877 A1 * | 3/2004 | Nakajima ................... 345/702 |
| 2005/0253816 A1 * | 11/2005 | Himberg et al. ............ 345/173 |

FOREIGN PATENT DOCUMENTS

DE    101 28 908 A1    12/2002
WO    WO 93/03468 A    2/1993

* cited by examiner

*Primary Examiner*—Alexander Eisen
*Assistant Examiner*—Christopher E Leiby

(57) ABSTRACT

An emulated hard key that emulates a key of a user-selected keyboard is generated on a reconfigurable keyboard. In one exemplary embodiment, the reconfigurable keyboard has an array of microchambers. Each microchamber is operable to change from a first height to a second height. A keyboard emulator controller controls the array of microchambers to set a first group of microchambers to the second height. When set to the second height, the first group of microchambers collectively emulates a first key of the user-selected keyboard.

24 Claims, 12 Drawing Sheets

USER INTERFACE INCORPORATING EMULATED HARD KEYS

DESCRIPTION OF THE RELATED ART

Many electronic devices typically include some form of user interface to provide an input to the electronic device. For example, a user operates a keyboard to enter data into a computer, a keypad to enter a phone number into a telephone, a remote control to operate a television set, or, a touch screen to enter data into a PDA. The proliferation of such user interfaces has led to various efforts aimed at producing an integrated interface that combines several interfaces into a single unit. For example, among television remotes, a lot of effort has been directed towards producing a "universal" remote that combines the functionality of multiple remote controls. Similarly, efforts have been directed towards providing in hand-held devices such as cell phones and PDAs, a smart user interface that can emulate various input devices based upon a selection carried out by the user. A PDA, for example, may have a touch screen that can be used to emulate a telephone-keypad functionality, or can, alternatively, be used to emulate a QWERTY keyboard for entering e-mail text.

In general, designers have attempted to optimize the layout of user interfaces by minimizing the number of keys that are presented to the user. Generally, such a minimization is carried out by using certain types of "hard" keys or by using "soft" keys. Hard keys can be laid out optimally in various ways. In one approach, a hard key can be designed to operate as a "dual-function" key that depends upon a function setting carried out by using an additional function-selector key. One example of such an additional function-selector key is the VCR/TV selector key of a TV remote control.

Unfortunately, each of the devices that are controlled via a multi-function user interface may have unique operating modes that are not shared with other devices, necessitating the use of a significant number of "single-function" hard keys. For example, several operating modes of a VCR are unique to the VCR, while several operating modes of a TV are unique to the TV, thereby requiring one set of dedicated, single-function keys for the VCR, and a second dedicated set for the TV.

It can therefore be appreciated that the hard key approach does not provide an optimal solution because it requires a large keypad to accommodate a large number of hard keys. One approach that was taken to overcome such a limitation is to replace a hard key keypad with a "touch-screen" containing soft keys. The touch-screen solution alleviates the need for providing a large keypad because two different key functions can be provided in the same display area by selecting either one or another touch-screen display. Therefore, a VCR touch-screen would display various controls for a VCR, while a TV touch-screen would replace the VCR touch-screen whenever the user decides to use the remote control to control the TV rather than the VCR.

Unfortunately, the touch-screen solution also suffers from certain handicaps. For example, a key-activation feedback, such as the key-click of the mechanical keys of a QWERTY keyboard, cannot be efficiently provided to the user of a touch-screen. This handicap can be attributed to the multiplicity of positions that various control icons can have upon a touch-screen display. For example, the location of the PLAY button icon upon a VCR touch-screen may not coincide with any of the control icons that are generated upon a TV touch-screen. Consequently, neither the TV nor the VCR control button icons can be designed to provide key-activation feedback in the form of a tactile response to finger pressure. As is known, tactile feedback is used to confirm the user's keystroke operation, thereby promoting speed and accuracy.

In an alternative to finger-operated soft-keys, soft-keys can also be operated using a stylus. The stylus approach provides certain advantages, especially for accommodating handwritten entries. Unfortunately, the stylus solution needs additional hardware in the form of the stylus, which can be easily lost or misplaced. Additionally, a stylus operator requires practice for carrying out handwritten data entry with an acceptable level of accuracy. This can lead to nervousness and frustration among novice users, many of whom are more familiar and more comfortable with a conventional QWERTY keyboard that provides tactile feedback. Generally, text entry using a QWERTY keyboard is significantly quicker than text entry using a stylus.

Based on the above-mentioned handicaps of existing user interfaces, an unaddressed need exists in the industry to overcome such deficiencies and inadequacies.

SUMMARY

One or more keyboards are emulated on the reconfigurable keyboard of a reconfigurable interface. In an exemplary embodiment, the reconfigurable keyboard has an array of microchambers. Each microchamber is operable to change from a first height to a second height. The exemplary embodiment additionally includes a keyboard emulator controller operable to set a first group of the microchambers in the array to the second height. The first group of microchambers collectively constitutes a first emulated hard key that emulates a first key of a first user-selected keyboard.

Clearly, some alternative embodiments may exhibit advantages and features in addition to, or in lieu of, those mentioned above. It is intended that all such alternative embodiments be included within the scope of the present invention, and be protected by the accompanying claims.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

The various embodiments generally describe systems and methods related to a reconfigurable interface that emulates a user-specified keyboard by generating hard keys associated with the user-specified keyboard. Furthermore, in one exemplary embodiment, the hard keys provide tactile feedback to the user of the reconfigurable interface.

Figure 1:
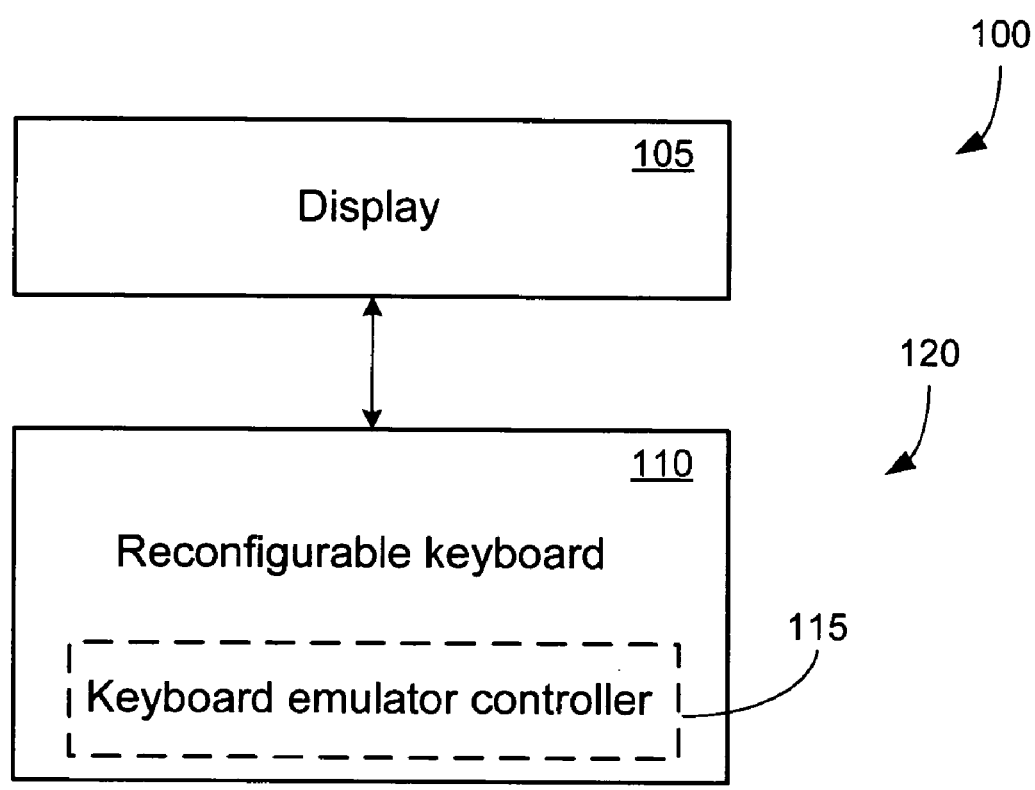
FIG. 1 shows a first exemplary embodiment of a device incorporating a reconfigurable keyboard of the present disclosure.

FIG. 1 shows an exemplary embodiment of a device 100 having a reconfigurable interface 120. Interface 120 includes a reconfigurable keyboard 110 containing a keyboard emulator controller 115. Reconfigurable keyboard 110 is communicatively coupled to a display 105 that provides a video display of images, text, and/or data, in response to user input through keyboard 110. Device 100 shown in FIG. 1 represents, in general, a hand-held device or any other device having one or more hard keys operable by the user. A few examples of such devices are: a personal digital assistant (PDA), a cellular phone, a desktop personal computer (PC), a laptop, and a hand-held remote control.

It will be understood that, where used, the term "keyboard" is intended for purposes of explanation only, and, consequently, the term encompasses various interfaces such as the keypad of a PDA, the keypad of a cellular phone, the data-entry tablet of a computer, and the control panel of a media player such as an MP3 player. Also, in the exemplary embodiment illustrated in FIG. 1, device 100 is shown to include a display 105. In an alternative embodiment, display 105 may be omitted, and in yet another alternative embodiment, keyboard emulator controller 115 may be located external to keyboard 110.

Figure 2A:
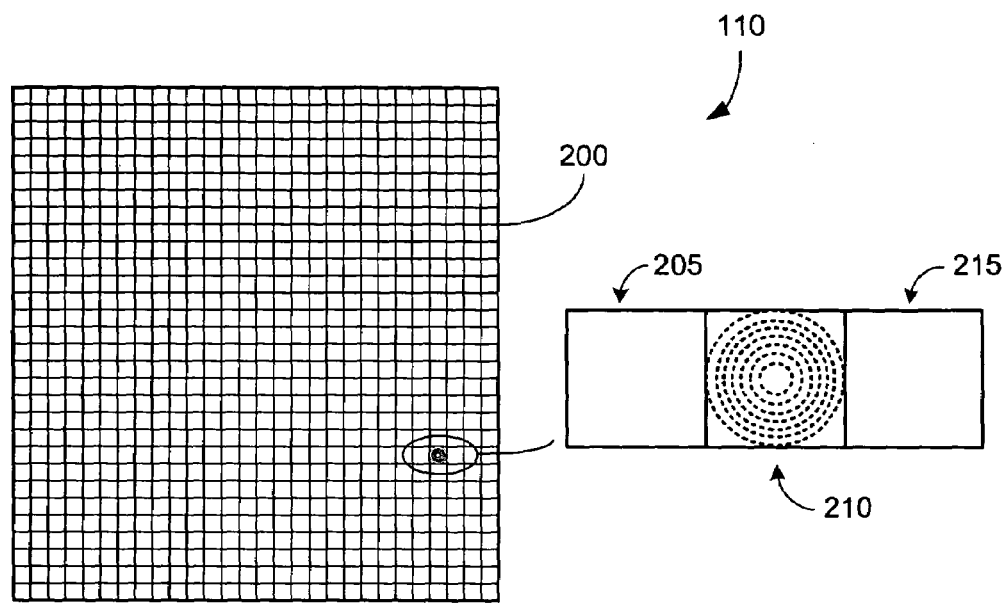
FIG. 2A shows a first exemplary system that uses an array of microchambers for implementing the reconfigurable keyboard shown in FIG. 1.
Figure 2B:
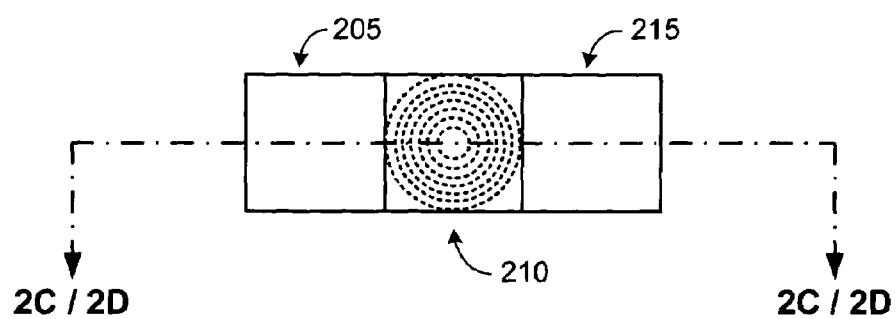
FIG. 2B shows three adjacent microchambers contained in the array of microchambers illustrated in FIG. 2A.

FIG. 2A illustrates an array 200 of microchambers used in a first exemplary embodiment of reconfigurable keyboard 110. In the context of this exemplary embodiment, a microchamber may be broadly described as an enclosure having a height that can be controllably varied to generate upon reconfigurable keyboard 110 an emulated hard key that emulates a key of a user-selected keyboard.

A first group of adjacent microchambers collectively provides one keypad surface equivalent to one hard key. Several such groups of adjacent microchambers may be used to emulate several hard keys. For example, if the ESC key of a QWERTY keyboard has a 2 $cm^2$ keypad surface area and each microchamber provides a 0.5 $cm^2$ keypad surface area, four such adjacent microchambers collectively provide the keypad surface area corresponding to the ESC key.

Turning to array 200, the individual dimensions, as well as the number of microchambers contained in array 200, are generally defined by the dimensions of the reconfigurable keyboard 110. Consequently, in an embodiment of reconfigurable keyboard 110 sized as a PDA keypad in which a key occupies a 24 $mm^2$ keypad surface area, each microchamber is configured in a first embodiment, to provide a 1 $mm^2$ keypad surface area, thereby allowing 24 adjacent microchambers to collectively provide the keypad surface area corresponding to one PDA key. In a second embodiment, each microchamber may be configured to provide a 4 $mm^2$ keypad surface area, thereby allowing 6 adjacent microchambers to collectively provide the keypad surface area corresponding to one PDA key.

Each microchamber of array 200 is generally configured to have two different heights—a first height corresponding to an unused surface of a keyboard and a second height corresponding to an emulated hard key. Three adjacent microchambers 205, 210, and 215 of array 200 are shown in FIGS. 2A, 2B, 2C, and 2D and are used below to describe the configuration of an emulated hard key.

Figure 2C:
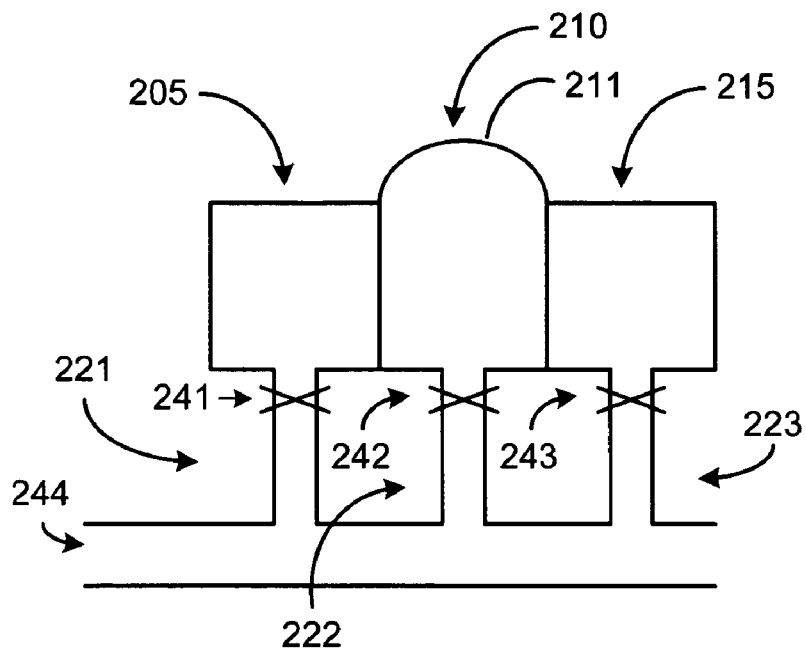
FIG. 2C illustrates one exemplary system for activating one of the three microchambers shown in FIG. 2B.

In a first embodiment, FIG. 2C shows a cross-sectional view of the three microchambers, with microchambers 205 and 215 each configured to have a first height, and microchamber 210 configured to have a second height that is greater than the first height. In this first embodiment, microchamber 210 constitutes one of a group of microchambers that collectively constitute a raised emulated hard key, while microchambers 205 and 215 constitute two of a group of microchambers that collectively constitute an inactive surface of the reconfigurable keyboard. The inactive surface of the reconfigurable keyboard corresponds to the inactive surface of a conventional keyboard, for example, the peripheral surface around hard keys of the keyboard.

Figure 2D:
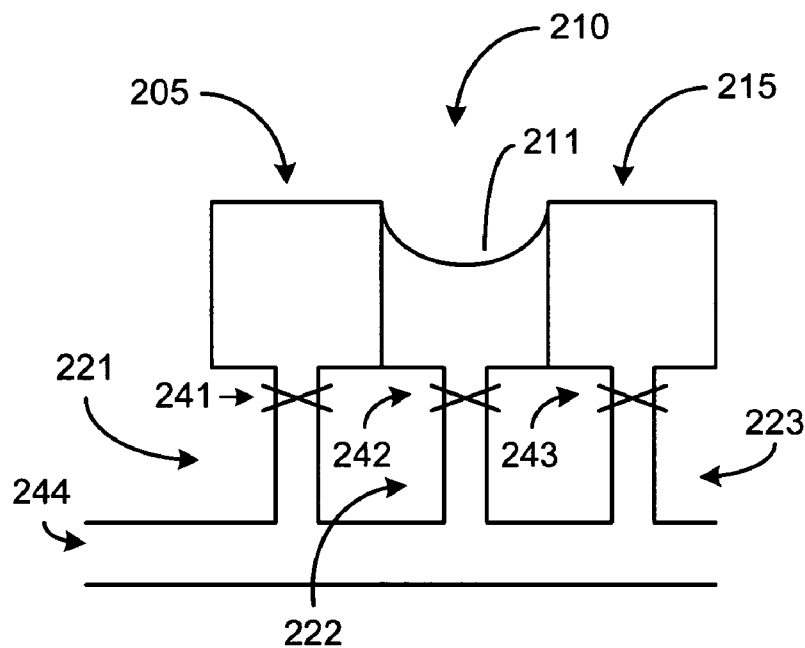
FIG. 2D illustrates another exemplary system for activating one of the three microchambers shown in FIG. 2B.

In a second embodiment, FIG. 2D shows a cross-sectional view of the three microchambers, with microchambers 205 and 215 each configured to have a first height, and microchamber 210 configured to have a second height that is less than the first height. In this second embodiment, microchamber 210 constitutes one of a group of microchambers that collectively constitute a recessed emulated hard key, while microchambers 205 and 215 constitute two of a group of microchambers that collectively constitute an inactive surface of the reconfigurable keyboard.

Various combinations of the above-described features will be used in various embodiments. For example, various groups of microchambers can be configured to be in one of three, rather than two, alternative positions: up (convex), flat, and down (concave). The up position denotes a raised emulated hard key, the down position a recessed emulated hard key, and the flat position the inactive surface of the reconfigurable keyboard. In a first embodiment, both the raised and recessed emulated hard keys are used for hard key functions, while in a second embodiment, the recessed emulated hard keys provide a place-holder functionality that makes it easier for the user's fingertips to locate functional raised emulated hard keys.

Several alternative systems and methods can be employed to implement the emulated hard keys using the microchambers shown in FIGS. 2A, 2B, 2C, and 2D. In a first exemplary embodiment, microchambers 205, 210, and 215 have ports 221, 222, and 223 respectively located at their bases. The ports are connected to a manifold 244 that carries air to the microchambers. Air is injected or removed from microchamber 210 via port 222 thereby raising or lowering, respectively, the upper surface 211 of microchamber 210 and configuring microchamber 210 as one microchamber of a group of microchambers that constitute a raised or recessed, respectively, emulated hard key. The upper surface 211 of microchamber 210 constitutes one portion of the keypad surface associated with reconfigurable keyboard 110. Microchamber 210 can be subsequently reconfigured to constitute the inactive surface of the reconfigurable keyboard by removing or injecting air via port 222.

Referring back to FIGS. 2C and 2D, bi-stable valves 241, 242, and 243 are optionally incorporated into each of the various ports. In a first position, each of the bi-stable valves allows air to flow from manifold 244 into the associated microchamber, and in a second position prevents air from exiting the microchamber. The bi-stable valves are operated sequentially, to allow a common air supply to configure each of the microchambers individually, thereby reducing the peak load on the common air supply. The bi-stable valves draw negligible current from an electrical source when in an inactive state, thereby reducing the electrical requirements for operating the reconfigurable keyboard.

Additionally, a pressure sensor (not shown) may be incorporated into each of the microchambers. The pressure sensor detects application of finger pressure upon the raised portion of the microchamber. This aspect will be explained in more detail below using other figures.

One or more of the features mentioned above may be optionally incorporated into one or more alternative embodiments that are described below.

In an alternative exemplary embodiment, a fluid, such as a liquid, a gel, an inert gas, or a viscous liquid is used to change the height of microchamber 210. Here again, ports 221, 222, and 223 are employed to carry out this operation.

In another alternative exemplary embodiment, each of the microchambers is filled with an electrogel. The amount of electrogel introduced into, and removed from, each microchamber, is controlled to provide either the first height or the second height of the microchamber.

In yet another alternative exemplary embodiment, each microchamber contains a piezo-electric material that changes its dimension when a voltage is applied to the material. The change in dimension can be used to increase or decrease the height of the micro chamber.

FIGS. 2A, 2B, 2C, and 2D will now be described in more detail. Firstly, while ports 221, 222, and 223 are shown located at the bottom of each microchamber, such ports can be located at other convenient locations with reference to each microchamber. Secondly, each microchamber is illustrated as having a cubic shape. This has been done merely for purposes of explanation, and alternative embodiments will have other shapes such as cylindrical, rhomboidal, and oval shapes.

Figure 3A:
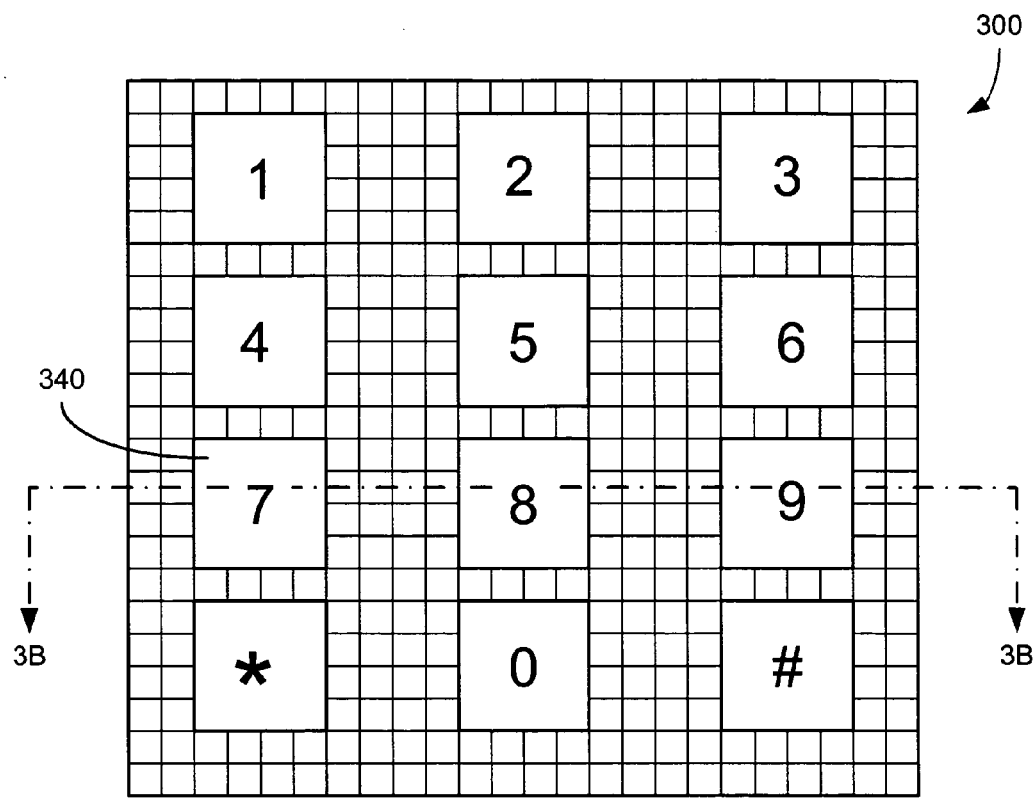
FIG. 3A shows the array shown in FIG. 2A configured, in a first exemplary embodiment, as a telephone keypad.
Figure 3B:
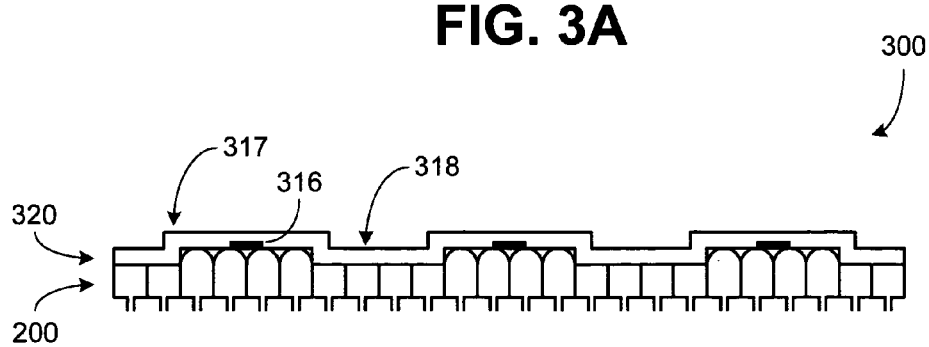
FIG. 3B shows a cross-sectional view of the telephone keypad depicted in FIG. 3A.

FIGS. 3A and 3B illustrate a first example of an array 200 of microchambers configured as a telephone keypad 300. In this exemplary embodiment each of the 12 keys of a conventional telephone keypad has been emulated by raising the top surfaces of each of 16 adjacent microchambers to form a raised, square keypad corresponding to each of the telephone keys. For example, the telephone key with numeral "7" 340 has been emulated by activating a 4×4 array of adjacent microchambers.

FIG. 3B provides a cross-sectional view of keypad 300. Keypad 300 is composed of an array 200 of microchambers upon which is superimposed a flexible display screen 320. Raised surface 317 corresponds to the raised keypad of numeral "7," and numeric display 316 corresponds to the label "7." Unraised surface 318, below which is located inactive microchambers, constitutes the inactive surface of keypad 300.

Display screen 320 typically comprises a flexible sheet of material. In one exemplary embodiment, display screen 320 is a flexible touch-pad coupled to a suitable display driver (not shown). The display screen displays characters, such as the label "7," at appropriate locations on the touch-pad depending upon the nature of the emulated keyboard. Consequently, while the label "7" is displayed in alignment with raised surface 317 for emulating the telephone keypad, display 320 can also be further used to display, at the same location, or elsewhere, alphanumeric characters associated with a QWERTY keyboard when such a keyboard is emulated by array 200.

In an alternative exemplary embodiment, display screen 320 is located underneath array 200. In such an embodiment, the material of microchambers of array 200 is transparent, so that the labels displayed by the display screen are visible to the user of the keyboard.

The emulated keypads may, optionally, provide tactile feedback. For example, in a first exemplary embodiment, when the user depresses keypad "7", the microchambers located below the raised surface 317 are each configured to undergo a momentary reduction in microchamber volume before returning to a quiescent volume. This may be implemented using a pressure sensor located in each or some of the microchambers. The pressure sensor senses pressure and releases a defined volume of the air contained in the microchamber when finger pressure causes the pressure in the microchamber to exceed a threshold pressure. Subsequently, after a suitable delay, the air in the microchambers is replenished to bring the activated microchambers back to their quiescent height.

Attention is drawn once again to FIG. 2C to further explain tactile feedback. A pressure sensor (not shown) located in microchamber 210 senses pressure applied to surface 211. When this pressure exceeds a certain threshold, bi-stable valve 242 is operated to release a defined volume of air from microchamber 210. Subsequently, after a suitable delay, bi-stable valve 242 is operated again to re-fill the microchamber 210 with air.

In a second exemplary embodiment of tactile feedback in which each of the activated microchambers contains an electrogel, a pressure sensor is again located in each or some of the microchambers. The pressure sensor detects a finger pressure that causes the pressure in the chamber to exceed a threshold pressure. When such a finger pressure is detected, a suitable voltage is applied to the electrogel, causing the electrogel to have a reduced stiffness. Consequently, the key "gives" under finger-pressure. After a predetermined delay a second voltage is applied to the electrogel causing the electrogel to revert to its original stiffness, thereby providing tactile feedback.

In a third exemplary embodiment of tactile feedback in which each of the microchambers contains a piezo-electric element, a pressure sensor is used to detect a finger pressure that causes the pressure in the chamber to exceed a threshold pressure. When such a finger pressure is detected, a voltage is applied to cause the piezo-electric element to vibrate. The vibration provides tactile feedback to the user of the keyboard. In other exemplary embodiments, other forms of feedback, such as audio feedback or visual feedback, are employed to confirm key depression. As examples, audio feedback can be implemented in the form of a beeping sound, while visual feedback can be implemented as a change in the appearance of the emulated hard key.

Figure 4A:
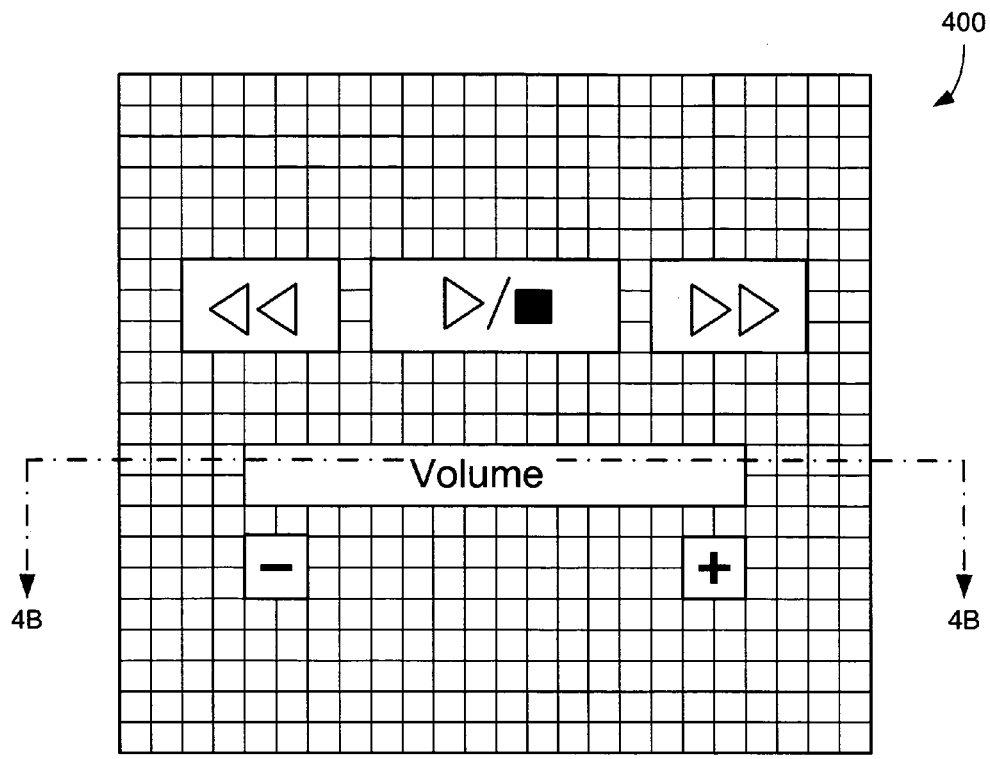
FIG. 4A shows the array shown in FIG. 2A configured, in a second exemplary embodiment, as a music-player keypad.
Figure 4B:
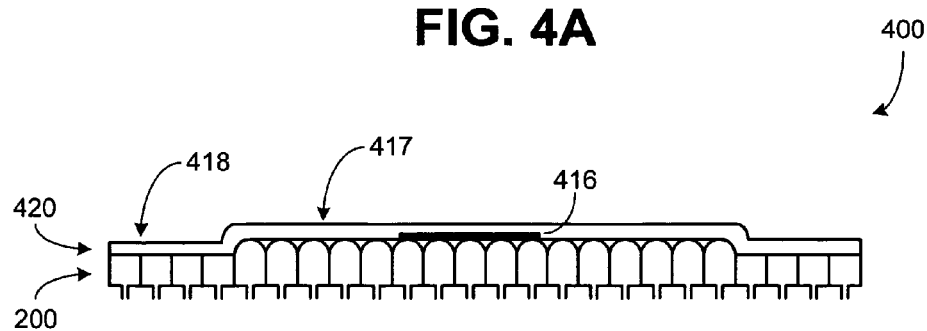
FIG. 4B shows a cross-sectional view of the music-player keypad depicted in FIG. 4A.

FIGS. 4A and 4B illustrate a second exemplary embodiment of an array 200 of microchambers configured as a media-player keypad 400. Unlike the square keypads of the embodiment shown in FIGS. 3A and 3B, keypad 400 has rectangular keys. In the example shown, the "volume" key has been emulated by activating 32 microchambers in a 2×16 array. FIG. 4B, which is a cross-sectional view of keypad 400 along the "volume" key, shows a display screen 420 superimposed upon the array 200 of microchambers. Raised surface 417 corresponds to the raised keypad of the "volume" key, while text display 416 corresponds to the label "Volume." Unraised surface 418, which is located above inactive microchambers, constitutes the inactive surface of keypad 400. As in the embodiment shown in FIG. 3A, the embodiment shown in FIG. 4A may also include tactile feedback as an optional feature.

Figure 5:
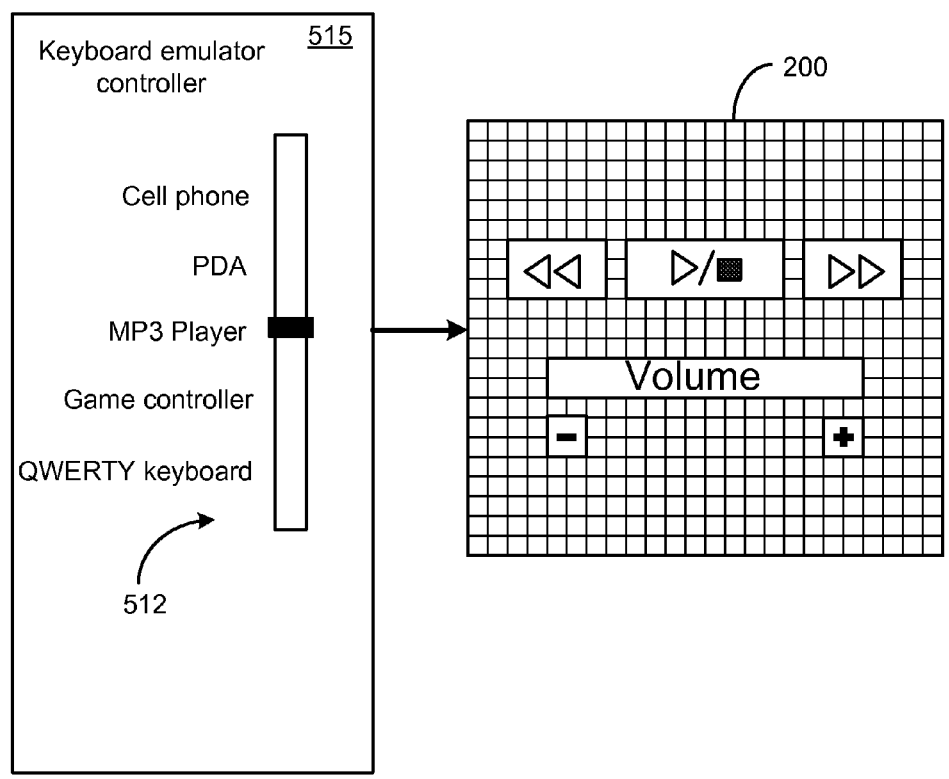
FIG. 5 shows the array shown in FIG. 2A communicatively coupled with a keyboard emulator controller having a selector to select one of several keyboards for emulation by the array of microchambers.

FIG. 5 shows a keyboard emulator controller 515 communicatively coupled to an array 200 of microchambers. The keyboard emulator controller 515 includes a selector 512, which is, for example, a slide-switch in one embodiment and a group of hard keys in another embodiment. Selector 512 is operated to select one of several keyboards for emulation by the array 200 of microchambers. In the example illustrated in FIG. 5, external selector 512 has been set to select emulation of an MP3 player. Consequently, keyboard emulator controller 515 configures array 200 to emulate an MP3 player keypad.

Figure 6A:
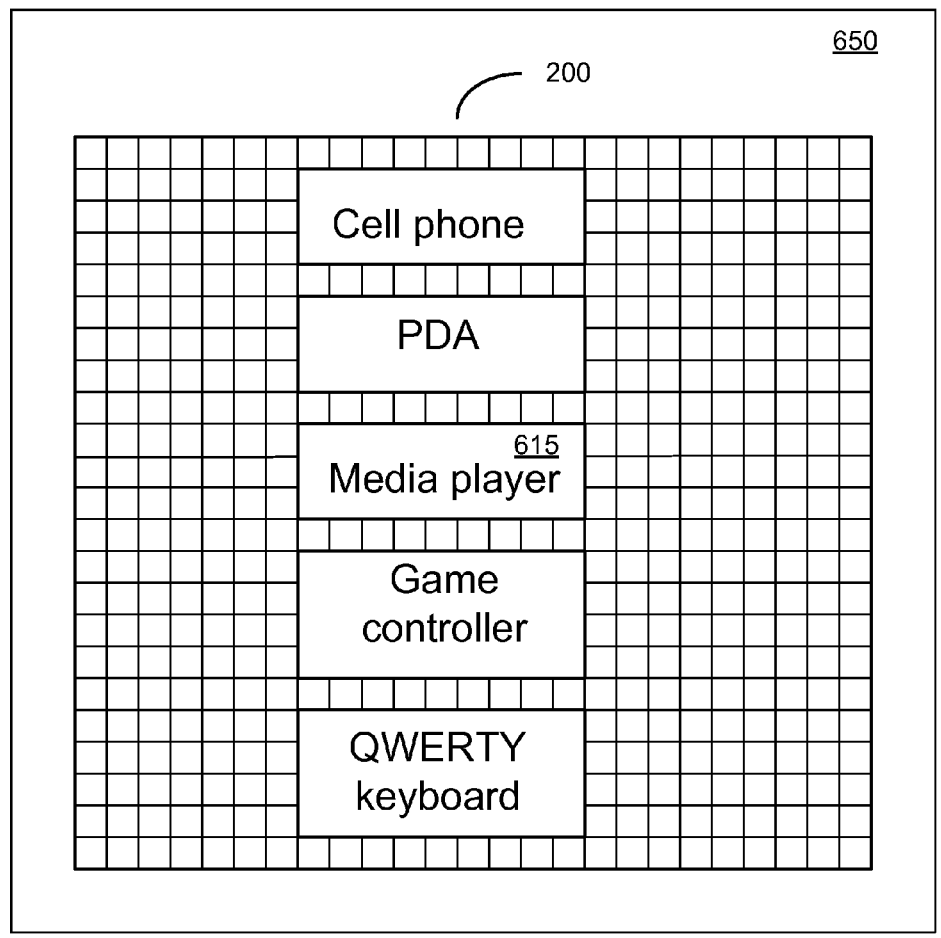
FIG. 6A shows the array of microchambers configured as a selector to select one of several keyboards for emulation by the array of microchambers.
Figure 6B:
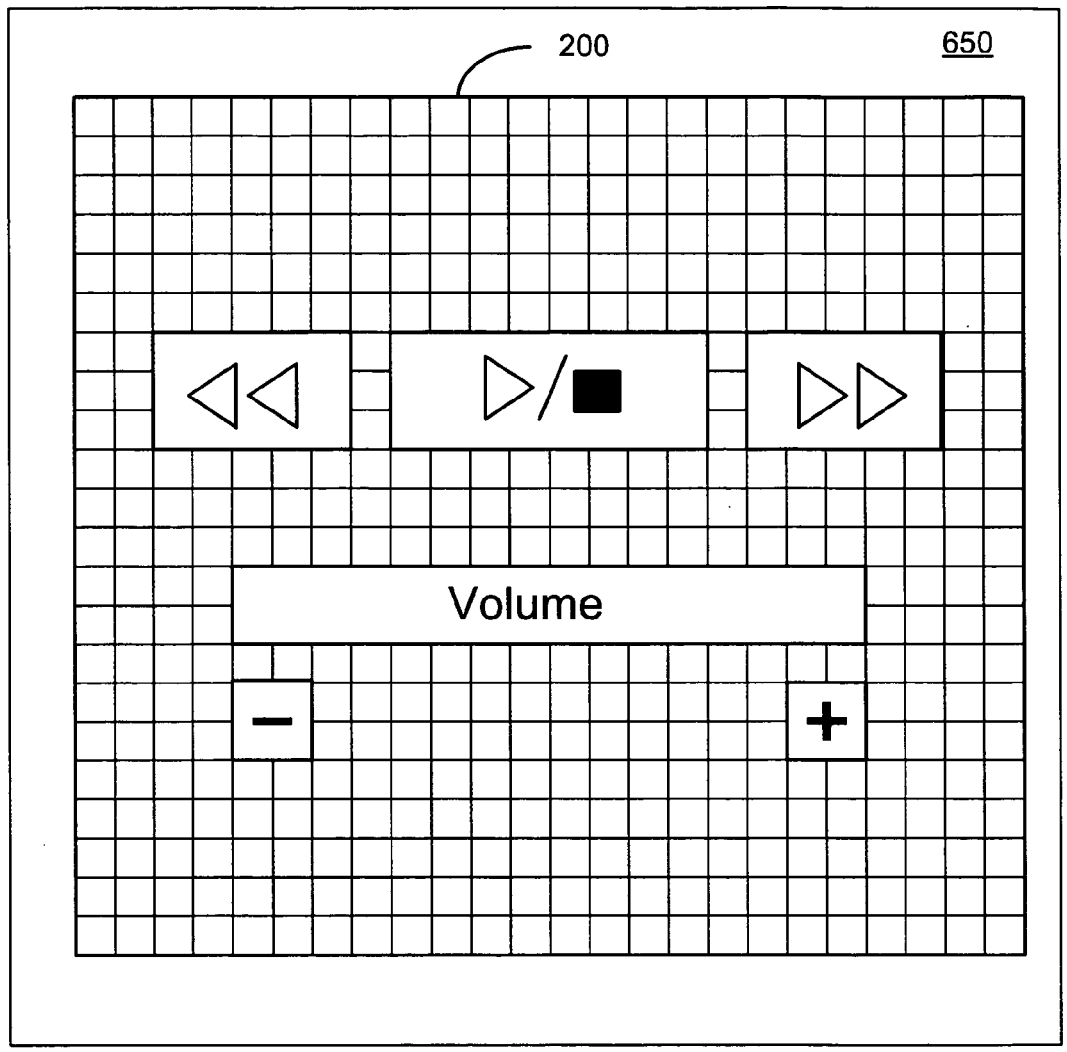
FIG. 6B shows the array of microchambers shown in FIG. 6A configured as the selected keyboard.

FIGS. 6A and 6B provide an alternative embodiment of a keyboard emulator controller. In FIG. 6A, keyboard emulator controller 650 incorporates array 200 of microchambers configured to provide the user a set of selector keys for selecting one of several keyboards for emulation by array 200 of microchambers. Once the user makes a selection, array 200 of microchambers is transformed by the keyboard emulator controller 650 into the appropriate emulated keyboard. For example, if media player 615 is selected, array 200 of microchambers is transformed into the media player keyboard shown in FIG. 6B.

Figure 7:
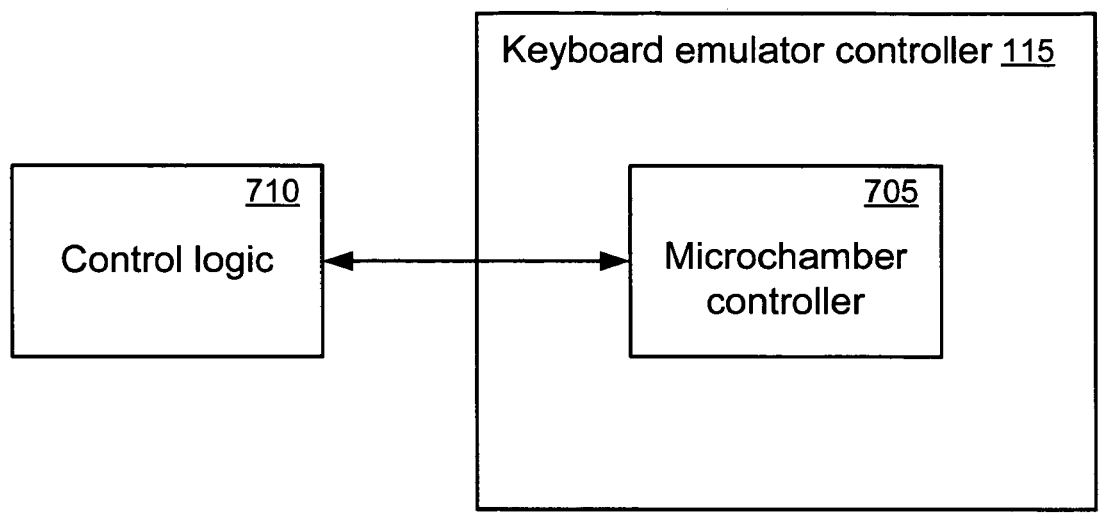
FIG. 7 shows an exemplary embodiment of a microchamber controller that is a part of a keyboard emulator controller of a reconfigurable keyboard.

FIG. 7 shows an exemplary embodiment of a microchamber controller 705 incorporated into keyboard emulator controller 115. Microchamber controller 705 comprises a system that facilitates the activation and de-activation of one or more microchambers of the array 200 of microchambers. Such a system may include, among various elements, one or more of the following: a gas injection system, a gas release system, a fluid injection system, a fluid release system, and a voltage generator system to apply voltage to a piezoelectric element or to an electrogel contained in a microchamber. The system further includes, if desired, a system to provide tactile feedback to the emulated keys as was explained above. In one embodiment, microchamber controller 705 includes manifold 244, bi-stable valves such as bi-stable valve 242, and ports such as port 222 which were described above with reference to FIGS. 2C and 2D.

Microchamber controller 705 is communicatively coupled to control logic 710, which provides various logical functions that are used to operate microchamber controller 705. For example, control logic 710 includes a system to obtain data from the pressure sensors and provide control signals for generating tactile feedback. Other functions include various touch-pad functions such as label generation and key activation sensing.

In one embodiment as shown in FIG. 7, control logic 710 is external to keyboard emulator controller 115 and in another embodiment is an integral part of keyboard emulator controller 115. When external to the keyboard emulator controller 115, control logic 710 may be a part of the logic circuitry contained in a device, such as device 100 shown in FIG. 1. In an embodiment in which device 100 is a PDA for example, control logic 710 is integrated into the microcontroller circuit contained inside the PDA. Similarly, control logic 710 can be integrated into the microcontroller circuit of a cellular phone. This type of integration permits optimal design of a new device having a reconfigurable keyboard, or permits retrofitting an existing device with a reconfigurable keyboard.

Figure 8A:
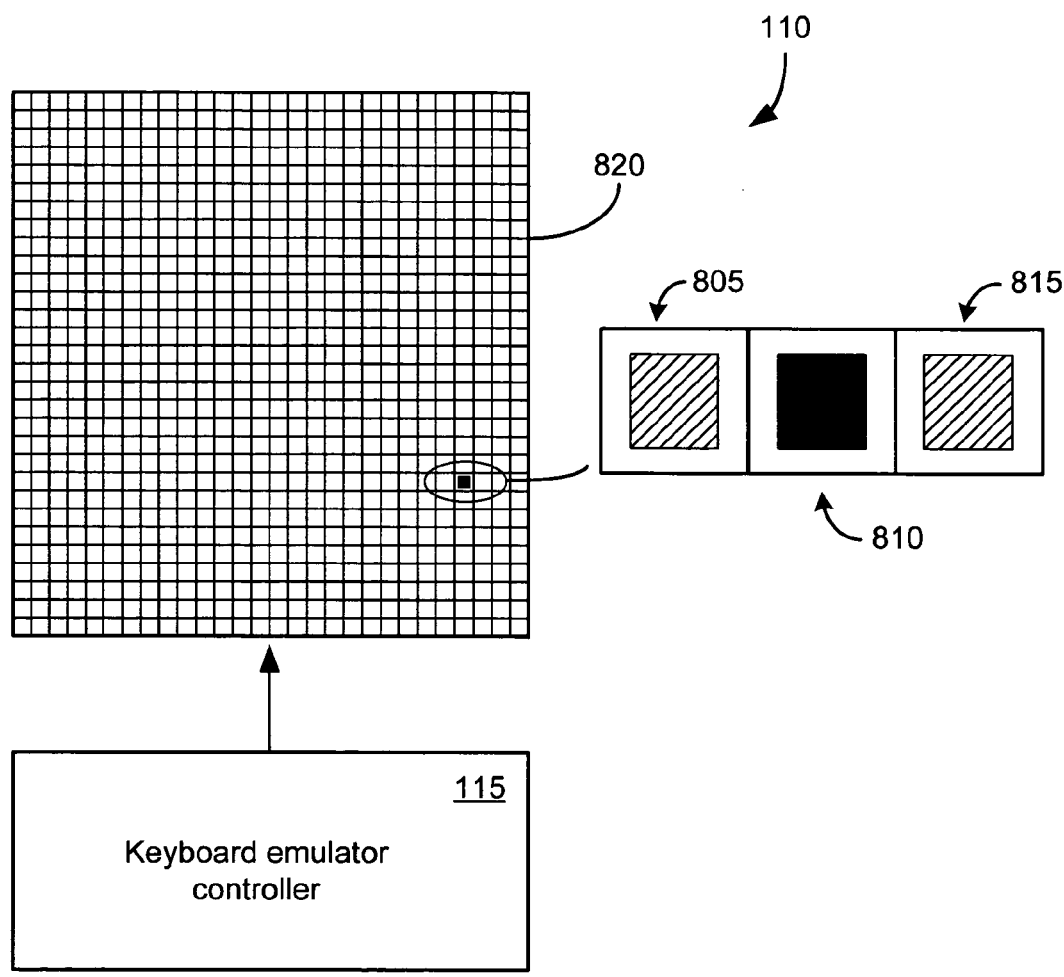
FIG. 8A shows a second exemplary system that incorporates a sensory feedback array for implementing the reconfigurable keyboard shown in FIG. 1.

FIG. 8A shows an exemplary system that incorporates a sensory feedback array 820 for implementing the reconfigurable keyboard 110 shown in FIG. 1. In the context of the present disclosure, a sensory feedback array generally comprises a collection of sensory feedback elements providing various touch-related and vision-related indicators associated with the emulated hard keys of a reconfigurable keyboard. A first group of such sensory feedback elements collectively provides one keypad surface area equivalent to one emulated hard key. Several such groups of adjacent sensory feedback elements are used to emulate multiple hard keys.

In a first exemplary embodiment, each of the sensory feedback elements includes a vibrator such as a piezoelectric crystal or a nano-device. Keyboard emulator controller 115 provides an electrical stimulus to the first group of sensory feedback elements corresponding to the emulated hard key. The electrical stimulus causes the sensory feedback elements to vibrate with a first vibration characteristic, for example, a low frequency vibration. This vibration can be felt through the user's fingertips when the user places his or her finger against these vibrating sensory feedback elements, thereby indicating the presence of an emulated hard key. On the other hand, the sensory feedback elements of the inactive surface of the keyboard do not provide such a vibration.

Three sensory feedback elements 805, 810, and 815 are shown in FIG. 8A, with sensory feedback element 810 configured to provide sensory feedback associated with an emulated hard key. In this example, sensory feedback elements 805 and 815 are not configured to provide sensory feedback because they are not associated with an emulated hard key. Therefore, when the user places his or her finger against these two sensory feedback elements no sensory feedback is provided. On the other hand, when the user places his or her finger upon sensory feedback element 810, which is a part of the first group of sensory feedback elements corresponding to the emulated hard key, sensory feedback is provided via the first vibration.

A pressure sensor (not shown) is located under or above sensory feedback element 810. When the user applies finger pressure to operate the emulated hard key, the pressure sensor is used to detect finger pressure greater than a preset threshold. When the finger pressure is greater than the preset threshold, the pressure sensor communicates this information to keyboard emulator controller 115. Keyboard emulator controller 115 then provides a second electrical stimulus to the group of sensory feedback elements, including sensory feedback element 810. The second electrical stimulus causes the sensory feedback elements to vibrate with a second vibration characteristic, for example, a high frequency vibration. This vibration can be felt through the user's fingertips and is indicative of key operation. The second vibration additionally provides tactile feedback to the user because the second vibration is generated only when finger pressure corresponding to key operation is applied upon the emulated hard key.

In a second exemplary embodiment, each of the sensory feedback elements 805, 810, and 815 comprises an electrode that provides an electric charge under control of the keyboard emulator controller 115. In the example shown in FIG. 8A, sensory feedback element 810 provides such a charge. Consequently, when the user places his or her finger against sensory feedback element 810, the electric charge provides an electrical stimulus that is felt as a mild electric shock by the user, thereby indicating the presence of an emulated hard key. Here again, a pressure sensor is used to detect a finger pressure greater than a preset threshold. When the finger pressure is greater than the preset threshold, which is indicative of a key operation, keyboard emulator controller 115 provides a stimulus to the sensory feedback elements for generating a second sensory feedback such as a vibration, a temperature change, a change in visual appearance, change in size etc. The second sensory feedback additionally provides tactile feedback to the user because the second sensory feedback is generated only when the user operates the emulated hard key.

In a third exemplary embodiment, the temperature of each of the sensory feedback elements 805, 810, and 815 is controlled by keyboard emulator controller 115. In the example shown in FIG. 8A, sensory feedback element 810 is configured to provide first sensory feedback in the form of a first temperature. Consequently, when the user places his or her finger against sensory feedback element 810, heat is transferred between sensory feedback element 810 and the user's finger thereby indicating the presence of the emulated hard key.

Furthermore, in the third exemplary embodiment, a pressure sensor is used to detect a finger pressure greater than a preset threshold which indicates key operation of the emulated hard key. When the finger pressure is greater than the preset threshold, keyboard emulator controller 115 provides a stimulus to the sensory feedback elements for generating a second sensory feedback such as a vibration, a temperature change, a change in visual appearance, change in size etc. This second sensory feedback additionally provides tactile feedback to the user because the second sensory feedback is generated only when the user operates the emulated hard key.

In a fourth exemplary embodiment, the appearance of each of the sensory feedback elements 805, 810, and 815 is controlled by the keyboard emulator controller 115. In the example shown in FIG. 8A, sensory feedback element 810 provides a first visual appearance indicative of the presence of an emulated hard key. For example, sensory feedback element 810 displays a blue color indicative of the presence of the emulated hard key, while sensory feedback elements 805 and 815 each display a gray color indicative of the inactive surface of the reconfigurable keyboard. As described above, a pressure sensor is used to detect key operation, and initiate second sensory feedback, for example, by changing the color of sensory feedback element 810 from the blue color to a red color thereby indicating key operation. The red color additionally provides tactile feedback indicating key operation.

It will be understood that various combinations of emulated hard key presence and emulated hard key operation indicators are used in various embodiments. For example, a vibrator may be used as the presence indicator of an emulated hard key, together with a visual indicator for indicating key operation.

Figure 8B:
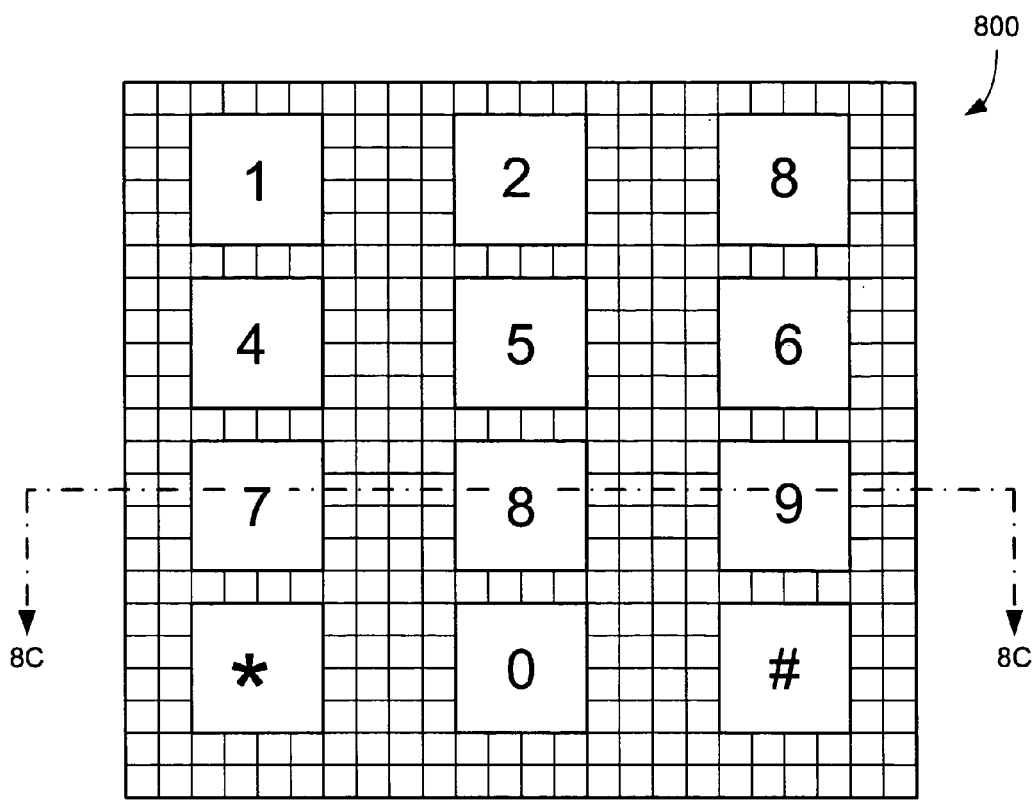
FIG. 8B shows the array shown in FIG. 8A configured, in a first exemplary embodiment, as a telephone keypad.
Figure 8C:
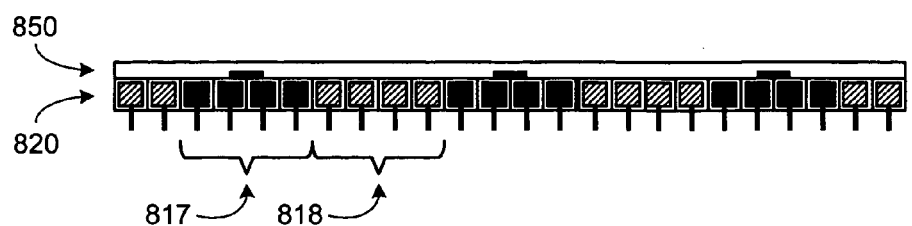
FIG. 8C shows a cross-sectional view of the telephone keypad depicted in FIG. 8B.

FIGS. 8B and 8C illustrate a first example of a sensory feedback array 820 configured as a telephone keypad 800. In this exemplary embodiment each of the 12 telephone keys has been emulated by 16 adjacent sensory feedback elements that form a square key corresponding to each of the telephone keys. For example, the telephone key with numeral "7" has been emulated by activating a 4×4 array of adjacent sensory feedback elements 817.

FIG. 8C shows a cross-sectional view of keypad 800. Keypad 800 includes an array 200 of sensory feedback elements and a display screen 850 overlaying array 200. In this exemplary embodiment, the surface of keypad 800 is flat. When the user places his or her finger upon the label "7" of display screen 850, sensory feedback elements 817 located under the label "7" provide a vibration to indicate the presence of an emulated hard key. When the user increases the pressure applied by his or her finger to operate the key, sensory feedback elements 817 provide a second vibration to indicate key operation. Alternatively, sensory feedback elements 817 may provide a sensation of heat when the user operates the key.

On the other hand, sensory feedback elements 818 that correspond to an inactive surface of keypad 800 will not provide a sensory feedback when the user places his or her fingertips upon this inactive surface even if a label is present upon this inactive surface. For example, such a label may correspond to a brand name or a model number of the product and does not have an emulated hard key located under the label. Display screen 850 typically comprises a flexible sheet of material that may be similar to the one described above using FIG. 3B.

Embodiments may further include other sensory feedback indicators such as, a variation in the texture of the keypad surface, a "stickiness" of the keypad surface, and a variation in the stiffness of the keypad surface. These embodiments may also incorporate audible and visual feedback indicators.

Figure 9:
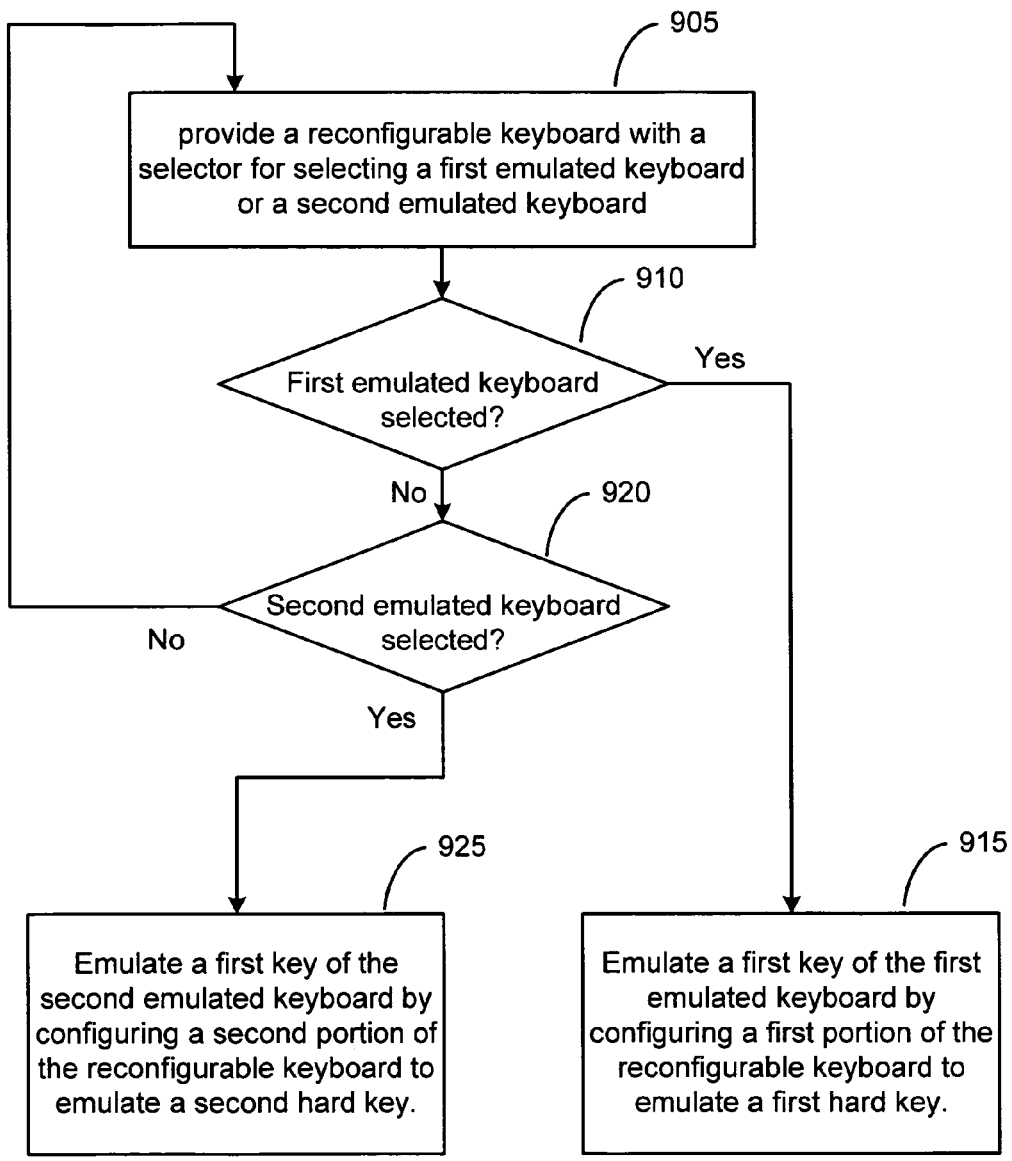
FIG. 9 is a flowchart of one exemplary method of keyboard emulation using a reconfigurable keyboard.

FIG. 9 shows a flowchart of one exemplary method of keyboard emulation using a reconfigurable keyboard such as the keyboard shown in FIG. 1. In block 905, a reconfigurable keyboard and a selector for selecting a first emulated keyboard or a second emulated keyboard are provided. For example, the first emulated keyboard may be a telephone keypad, while the second emulated keyboard corresponds to a PDA.

Query block 910 determines whether the first emulated keyboard has been selected. When the first emulated keyboard is selected, a first key of the first emulated keyboard is emulated by configuring at least a portion of the reconfigurable keyboard to emulate a first hard key. The action of block 915 pertains to generating an emulated hard key of the first emulated keyboard by, for example, raising the height of a portion of the reconfigurable keyboard. Consequently, if the first emulated keyboard is a telephone keypad, the emulated hard key corresponds to a raised numerical key, for example, numeral "7."

When the first emulated keyboard is not selected, query block 920 determines whether the second emulated keyboard has been selected. When the second keyboard has been selected, a first key of the second emulated keyboard is emulated by configuring at least a portion of the reconfigurable keyboard to emulate a second hard key. The action of block 925 pertains to generating an emulated hard key of the second emulated keyboard by, for example, raising the height of a portion of the reconfigurable keyboard. Therefore, if the second emulated keyboard is a PDA keypad, the generated emulated hard key is a raised key corresponding to a text alphabet, for example, the alphabet "A."

The above-described embodiments are merely set forth for a clear understanding of the principles of the disclosure. Many variations and modifications may be made without departing substantially from the disclosure. All such modifications and variations are included herein within the scope of this disclosure.

We claim:

1. A reconfigurable interface, comprising:
    a reconfigurable keyboard configurable to emulate a first user-selected keyboard, the reconfigurable keyboard comprising an array of microchambers, each microchamber coupled to a port though which a fluid is injected into the microchamber for changing the microchamber from a first height to a second height, each port including a bi-stable valve operable for regulating the injection of the fluid into the microchamber; and
    a keyboard emulator controller operable to emulate a first user-selected keyboard upon the reconfigurable keyboard, the emulation comprising setting a first group of microchambers in the array to the second height by operating a respective set of bi-stable valves for injecting the fluid into each of the first group of microchambers, whereupon the first group of microchambers collectively constitute a first emulated hard key that emulates a first key of the first user-selected keyboard.

2. The reconfigurable interface of claim 1, wherein the keyboard emulator controller is further configured to operate the respective set of bi-stable valves for extracting fluid from each of the microchambers in the first group of microchambers, whereby the first group of microchambers is reset to the first height for emulating an inactive portion of the first user-selected keyboard.

3. The reconfigurable interface of claim 2, wherein the keyboard emulator controller is further operable to set a second group of microchambers to the second height, the second group of microchambers collectively constituting a second emulated hard key that emulates a first key of a second user-selected keyboard.

4. The reconfigurable interface of claim 3, wherein at least one of the microchambers is common to the first group of microchambers and the second group of microchambers.

5. The reconfigurable interface of claim 1, in which the keyboard emulator controller comprises:
    a microchamber controller operable to provide to a microchamber a first volume of fluid corresponding to the first height of the microchamber, and a second volume of fluid corresponding to the second height of the microchamber.

6. The reconfigurable interface of claim 1, wherein the fluid comprises one of air, a liquid, a gas, and a gel.

7. The reconfigurable interface of claim 1, wherein the first user-selected keyboard comprises one of a QWERTY keyboard, a cellphone keypad, a music player keypad, and a game controller keypad.

8. The reconfigurable interface of claim 1, wherein the reconfigurable keyboard comprises a first portion operable to provide, under control of the keyboard emulator controller, a sensory feedback in the form of a vibration.

9. The reconfigurable interface of claim 1, wherein the reconfigurable keyboard comprises a first portion operable in response to the keyboard emulator controller to provide sensory feedback in the form of a first electric stimulus to a user of the reconfigurable keyboard.

10. The reconfigurable interface of claim 1, wherein the reconfigurable keyboard comprises a first portion operable in response to the keyboard emulator controller for providing sensory feedback in the form of a temperature change.

11. The reconfigurable interface of claim 1, wherein the keyboard emulator controller is further configured to operate the respective set of bi-stable valves for momentarily extracting and then re-injecting at least a portion of the fluid in the first group of microchambers thereby providing a tactile feedback from the first emulated hard key.

12. The reconfigurable interface of claim 1, wherein the keyboard emulator controller is further configured to operate the respective set of bi-stable valves for changing the first group of microchambers to a third height by extracting at least a portion of the fluid from the first group of microchambers.

13. The reconfigurable interface of claim 12, wherein the first group of microchambers of the third height constitutes a second emulated hard key that emulates a first key of a second user-selected keyboard.

14. A method of keyboard emulation, the method comprising:
    providing a reconfigurable keyboard;
    providing a selector for selecting at least one of a first emulated keyboard and a second emulated keyboard;
    emulating, when the first emulated keyboard is selected, a first key of the first emulated keyboard by configuring a first portion of the reconfigurable keyboard to emulate a first hard key, wherein configuring the first portion of the keyboard comprises:
        opening a first bi-stable valve coupled to a first port of a first microchamber:
        injecting a fluid into the first microchamber for changing the height of the first microchamber from a first height to a second height; and
    emulating, when the second emulated keyboard is selected, a first key of the second emulated keyboard by configuring a second portion of the reconfigurable keyboard to emulate a second hard key, wherein configuring the second portion of the keyboard comprises:
        opening a second bi-stable valve coupled to a second port of a second microchamber:
        injecting the fluid into the second microchamber for changing the height of the second microchamber from the first height to the second height.

15. The method of claim 14, further comprising providing a tactile feedback to a user via at least one of a) the first emulated hard key and b) the second emulated hard key.

16. The method of claim 14, wherein:
    the reconfigurable keyboard comprises a first surface; and
    configuring one of a) the first emulated hard key and b) the second emulated hard key further comprises providing a tactile feedback by vibrating the first surface in the respective one of the first portion and the second portion.

17. The method of claim 14, wherein:
    the reconfigurable keyboard comprises a first surface; and
    configuring one of a) the first emulated hard key and b) the second emulated hard key comprises providing a first electrical stimulus from the first surface in the respective one of the first portion and the second portion, the first electrical stimulus being operative as a tactile feedback.

18. The method of claim 14, wherein:
    the reconfigurable keyboard comprises a first surface of the keyboard; and
    configuring one of a) the first emulated hard key and b) the second emulated hard key comprises providing a tactile feedback by changing a temperature of the first surface in the respective one of the first portion and the second portion.

19. The method of claim 14, further comprising:
extracting at least a portion of the fluid from the first microchamber for changing the height of the first microchamber to a third height.

20. A reconfigurable interface, comprising:
a reconfigurable keyboard that includes an array of microchambers, each microchamber comprising:
  a port; and
  a bi-stable valve; and
a keyboard emulator controller operable to place the bi-stable valve in an open position for one of a) injecting a fluid into a respective microchamber or b) extracting the fluid from the respective microchamber, the keyboard controller further operable to configure a first group of microchambers to collectively represent an emulated hard key of a keyboard by controlling the quantity of fluid contained in each of the microchambers in the first group of microchambers.

21. The reconfigurable interface of claim 20, wherein the keyboard emulator controller is further operable to place the bi-stable valve in a closed position for retaining the fluid in the microchamber.

22. The reconfigurable interface of claim 20, wherein the quantity of fluid contained in each of the microchambers is selected to place each of the microchambers in the first group of microchambers to one of a) a first height or b) a second height.

23. The reconfigurable interface of claim 22, wherein the keyboard controller is further operable to control the quantity of fluid contained in each microchamber of a second group of microchambers for setting the second group of microchambers to a third height that is lower than each of the first and second heights, the third height representing a recessed emulated hard key.

24. The reconfigurable interface of claim 23, wherein the recessed emulated hard key provides a place-holder functionality to assist a user in locating a functional emulated hard key having one of the first or second height.

* * * * *

UNITED STATES PATENT AND TRADEMARK OFFICE
CERTIFICATE OF CORRECTION

PATENT NO. : 7,382,357 B2  
APPLICATION NO. : 11/113930  
DATED : June 3, 2008  
INVENTOR(S) : Georgios Panotopoulos et al.

It is certified that error appears in the above-identified patent and that said Letters Patent is hereby corrected as shown below:

Column 11, Line 9, Claim 1, delete "though" and insert -- through --;

Column 12, Line 26, Claim 14, delete "microchamber:" and insert -- microchamber; --;

Column 12, Line 37, (Approx.), Claim 14, delete "microchamber:" and insert -- microchamber; --

Signed and Sealed this

Twenty-sixth Day of October, 2010

David J. Kappos  
*Director of the United States Patent and Trademark Office*